(12) United States Patent
Hussain

(10) Patent No.: US 11,664,605 B1
(45) Date of Patent: *May 30, 2023

(54) COMMUNICATION SYSTEM WITH FPGA DOA ARRIVAL ESTIMATION

(71) Applicant: Prince Mohammad Bin Fahd University, Dhahran (SA)

(72) Inventor: Ahmed Abul Hussain, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,713

(22) Filed: Oct. 26, 2022

Related U.S. Application Data

(63) Continuation of application No. 17/828,830, filed on May 31, 2022, now Pat. No. 11,563,277.

(51) Int. Cl.
| | | |
|---|---|---|
| *H01Q 21/06* | (2006.01) | |
| *H04B 7/06* | (2006.01) | |
| *H01Q 3/34* | (2006.01) | |
| *H01Q 21/20* | (2006.01) | |
| *H04B 7/0456* | (2017.01) | |

(52) U.S. Cl.
CPC ............ *H01Q 21/061* (2013.01); *H01Q 3/34* (2013.01); *H01Q 21/205* (2013.01); *H04B 7/0456* (2013.01); *H04B 7/0639* (2013.01)

(58) Field of Classification Search
None
See application file for complete search history.

(56) References Cited

U.S. PATENT DOCUMENTS

| | | | | |
|---|---|---|---|---|
| 6,188,352 B1 * | 2/2001 | Choi | ............ | H04B 7/0865 |
| | | | | 342/378 |
| 6,351,238 B1 * | 2/2002 | Kishigami | ............ | G01S 3/74 |
| | | | | 342/417 |
| 6,498,581 B1 * | 12/2002 | Yu | ............ | G01S 13/4463 |
| | | | | 342/147 |

(Continued)

FOREIGN PATENT DOCUMENTS

| | | |
|---|---|---|
| EP | 2 098 881 A2 | 9/2009 |
| JP | 2019-90749 A | 6/2019 |

OTHER PUBLICATIONS

Tayem, et al.; QR-TLS Esprit for Source Localization and Frequency Estimations; IEEE Xplore; 2013; 5 pages.

(Continued)

*Primary Examiner* — Hassan A Phillips
*Assistant Examiner* — Gautam Sharma
(74) *Attorney, Agent, or Firm* — Oblon, McClelland, Maier & Neustadt, L.L.P.

(57) ABSTRACT

A communications device includes a uniform linear array of M antennas and a field programmable gate array (FPGA) having pipelined stages in which execution of overlapping instructions estimate a direction of arrival of RF signals from multiple sources. A preprocessing stage of the FPGA includes at least one configurable logic block configured to apply forward/backward averaging spatial smoothing to a signal space matrix extracted from a covariance matrix in the preprocessing stage. The FPGA further includes at least one configurable logic block configured to compute the direction of arrival angle for the RF signals using a least squares method.

10 Claims, 8 Drawing Sheets

(56) References Cited

U.S. PATENT DOCUMENTS

| | | | |
|---|---|---|---|
| 7,912,680 B2* | 3/2011 | Shirakawa | G01S 3/74 |
| | | | 702/196 |
| 9,411,035 B2* | 8/2016 | Tsai | G01S 3/74 |
| 9,735,940 B1* | 8/2017 | Bakr | H04W 4/06 |
| 11,563,277 B1* | 1/2023 | Hussain | H01Q 21/061 |
| 2007/0187571 A1* | 8/2007 | Ebe | G02B 7/36 |
| | | | 250/201.2 |
| 2013/0300596 A1 | 11/2013 | Shirakawa | |
| 2022/0030401 A1* | 1/2022 | Oshima | G01S 3/74 |
| 2022/0225118 A1* | 7/2022 | Pefkianakis | H04W 64/006 |
| 2022/0286168 A1* | 9/2022 | Raghavan | H04W 72/0453 |

OTHER PUBLICATIONS

Thiripurasundari et al.; "FPGA realisation-based architecture for direction-of-arrival in wireless communication", International Journal of Networking and Virtual Organisations, vol. 17, Issue 2-3; pp. 137-148; Jan. 2017; Abstract Only; 4 Pages.

Hussain, et al.; Computationally Efficient Forward/backward Averaged DOA Estimation of Coherent Sources in Pairs; 94th IEEE VTC Fall 2021 Virtual Conference, Sep. 27-30, 2021; 7 Pages.

Hussain, et al.; FPGA-based Hardware Implementation of Computationally Efficient Multi-Source DOA Estimation Algorithms; IEEE Access, vol. 7; Jul. 2, 2019; 14 Pages.

Hussain, et al.; FPGA Hardware Implementation of DOA Estimation Algorithm Employing LU Decomposition; IEEE Access; 2018; 16 pages.

* cited by examiner

FIG. 5A: TABLE II.

|  | Non-coherent | | Coherent (existing) | | Coherent (disclosed) | |
|---|---|---|---|---|---|---|
| FPGA Resource | QR | CHOL | QR | CHOL | QR | CHOL |
| Total Slices | 65.2 | 59.4 | 75.3 | 63.8 | 69.9 | 63.7 |
| Slice Registers | 32.0 | 29.2 | 38.3 | 31.2 | 35.2 | 31.4 |
| Slice LUTs | 42.2 | 37.2 | 52.5 | 40.2 | 46.2 | 40.1 |
| Block RAMs | 4.1 | 4.1 | 4.1 | 4.1 | 4.1 | 4.1 |
| DSP48s | 42.0 | 35.9 | 43.8 | 36.7 | 38.8 | 34.5 |

FIG. 5B: TABLE III.

|  | Non-coherent | | Coherent (existing) | | Coherent (disclosed) | |
|---|---|---|---|---|---|---|
| FPGA Resource | QR | CHOL | QR | CHOL | QR | CHOL |
| Total Slices | NA | 95.6 | NA | 99.3 | NA | 98.0 |
| Slice Registers | NA | 46.6 | NA | 53.2 | NA | 49.6 |
| Slice LUTs | NA | 82.4 | NA | 89.2 | NA | 87.0 |
| Block RAMs | NA | 7.4 | NA | 7.4 | NA | 7.4 |
| DSP48s | NA | 62.3 | NA | 78.1 | NA | 62.3 |

FIG. 6A: TABLE IV

|  | Non-coherent | | Coherent (existing) | | Coherent (disclosed) | |
|---|---|---|---|---|---|---|
|  | QR | CHOL | QR | CHOL | QR | CHOL |
| No. of clock cycles | 190 | 194 | 193 | 197 | 193 | 197 |
| Fmax (MHz) | 57.5 | 63.0 | 53.1 | 60.4 | 54.8 | 61.6 |
| Computation time (µs) | 3.3 | 3.08 | 3.63 | 3.26 | 3.52 | 3.2 |

FIG. 6B: TABLE V

|  | Non-coherent | | Coherent (existing) | | Coherent (disclosed) | |
|---|---|---|---|---|---|---|
|  | QR | CHOL | QR | CHOL | QR | CHOL |
| No. of clock cycles | 192 | 196 | 195 | 199 | 195 | 199 |
| Fmax (MHz) | NA | 43.0 | NA | 45.3 | NA | 45.6 |
| Computation time (µs) | NA | 4.56 | NA | 4.39 | NA | 4.36 |

COMMUNICATION SYSTEM WITH FPGA DOA ARRIVAL ESTIMATION

CROSS-REFERENCE TO RELATED APPLICATIONS

The present application is a Continuation of U.S. application Ser. No. 17/828,830, now allowed, having a filing date of May 31, 2022.

STATEMENT REGARDING PRIOR DISCLOSURE BY THE INVENTORS

Aspects of this technology are described in an article "FPGA Hardware Implementation of Computationally Efficient DOA Estimation of Coherent Signals," 2021 International Conference on Radar, Antenna, Microwave, Electronics, and Telecommunications (ICRAMET), 2021, and is herein incorporated by reference in its entirety.

STATEMENT OF ACKNOWLEDGEMENT

The author would like to acknowledge the support provided by the Wireless Communications & Signal Processing Research Lab at Prince Mohammad bin Fahd University, Al Khobar, KSA, for support of this work.

BACKGROUND

Technical Field

The present disclosure is directed to a method, system and computer program product for Direction of Arrival (DOA) estimation of coherent RF signal sources, especially as reflected in a hardware implementation of a method for Direction of Arrival (DOA) estimation of coherent RF signal sources. The implementation includes applying a forward/backward averaging (FBA) spatial smoothing to the signal space in the preprocessing stage. Also, the data matrix may be constructed based on signal space in order to reduce the computation cost and memory requirements.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Multiple-input multiple-output (MIMO) spatial multiplexing and beamforming are regarded as key technology enablers for the fifth-generation (5G) millimeter wave (mm-Wave) mobile radio services. Spatial multiplexing requires sufficiently separated and incoherent antenna array elements, while in the case of beamforming, the antenna array elements need to be coherent and closely spaced. With regard to MIMO, direction-of-arrival (DOA) estimation refers to the process of retrieving the direction information of several electromagnetic waves/sources from the outputs of a number of receiving antennas that form a sensor array. DOA estimation is a major problem in array signal processing and has wide applications in radar, sonar, wireless communications.

Spatial multiplexing is the ability to transmit multiple data streams, using the same time and frequency resource, where each data stream can be beamformed. The purpose of MIMO is to increase throughput. MIMO builds on the basic principle that when the received signal quality is high, it is better to receive multiple streams of data with reduced power per stream, than one stream with full power. The potential is large when the received signal quality is high and the streams do not interfere with each other. The potential diminishes when the mutual interference between streams increases.

Single-user MIMO (SU-MIMO) is the ability to transmit one or multiple data streams, called layers, from one transmitting array to a single user. SU-MIMO can thereby increase the throughput for that user and increase the capacity of the network. The number of layers that can be supported, called the rank, depends on the radio channel. To distinguish between down link (DL) layers, a user equipment (UE) needs to have at least as many receiver antennas as there are layers.

In multi-user MIMO (MU-MIMO), the antenna system simultaneously sends different layers in separate beams to different users using the same time and frequency resource, thereby increasing the network capacity. In order to use MU-MIMO, the system needs to find two or more users that need to transmit or receive data at the very same time. Also, for efficient MU-MIMO, the interference between the users should be kept low. This can be achieved by using generalized beamforming with null forming such that when a layer is sent to one user, nulls are formed in the directions of the other simultaneous users.

Rather than sending a signal from a broadcast antenna to be spread in all directions—how a signal would traditionally be sent—beamforming uses multiple antennas to send out and direct the same signal toward a single receiving device, such as a laptop, smartphone or tablet. When receiving, beamforming is the ability to collect the signal energy from a specific transmitter. In multi-path scenarios, where the radio channel comprises multiple propagation paths from transmitter to receiver through diffraction around corners and reflections against buildings or other objects, it is beneficial to send the same data stream in several different paths (direction and/or polarization) with phases and amplitudes controlled in a way that they add constructively at the receiver. This is referred to as generalized beamforming.

In addition, DOA estimation of a radio frequency (RF) signal is a very important component in several other practical applications such as channel estimation and radar and sonar tracking. Digital Signal Processors are typically used for real-time implementation of signal processing such as DOA estimation.

Field-programmable gate arrays (FPGAs) contain an array of programmable logic blocks, and a hierarchy of reconfigurable interconnects allowing blocks to be wired together. The most common FPGA architecture consists of an array of logic blocks (called configurable logic blocks, CLBs, or logic array blocks, LABs, depending on vendor), I/O pads, and routing channels. Generally, all the routing channels have the same width (number of wires). Multiple I/O pads may fit into the height of one row or the width of one column in the array. A logic block consists of a few logical cells (called ALM, LE, slice etc.). A typical cell consists of a 4-input LUT, a full adder (FA) and a D-type flip-flop. These might be split into two 3-input LUTs. The Virtex series of FPGAs are based on CLBs, where each CLB is equivalent to multiple ASIC gates.

It is one object of the present disclosure to describe a system and method that provides an efficient real-time hardware implementation of DOA estimation algorithms that minimizes resources consumption and computation time while offering high estimation accuracy.

SUMMARY

In an exemplary embodiment, a communications device, can include a uniform linear array of M antennas; a field programmable gate array (FPGA) having pipelined stages in which execution of overlapping instructions estimate a direction of arrival of RF signals from multiple sources, wherein a preprocessing stage of the FPGA includes at least one configurable logic block configured to apply forward/backward averaging spatial smoothing to a signal space matrix extracted from a covariance matrix in the preprocessing stage; the FPGA further includes at least one configurable logic block configured to compute the direction of arrival angle for the RF signals using a least squares method.

In a further exemplary embodiment pipelined field programmable gate array (FPGA) circuit, can include a first stage configured to compute a covariance matrix for a plurality of RF signals received from an array of antenna elements; a second stage configured to extract a signal space, in which the covariance matrix is factorized using a decomposition process to extract the signal space matrix, where the signal space matrix is an M×K signal space matrix, M>K; a third stage configured to de-correlate the signal space matrix using Forward/Backward Averaging, in which the de-correlation is performed by applying the forward/backward averaging method to the signal space data matrix to obtain a Qfb data matrix, partitioned into sub-matrices Qfb1 and Qfb2; a fourth stage configured to compute a direction matrix, by determining a least square solution of a transform T that relates the sub-matrices Qfb1 and Qfb2; a fifth stage configured to compute Eigenvalues, in which eigenvalues of transform T are computed; and a sixth stage configured to compute direction of arrival (DoA) angle estimates, in which angle estimates are computed using the eigenvalues.

In a further exemplary embodiment a field programmable gate array (FPGA) circuit, can include a preprocessing stage that includes at least one configurable logic block configured to apply forward/backward averaging spatial smoothing to a signal space matrix extracted from a covariance matrix for a plurality of RF signals; and at least one configurable logic block configured to compute a direction of arrival angle for the RF signals using a least squares method, wherein the configurable logic block configured for forward/backward averaging includes I/O pins connected to a number of adders that is a linear multiple of a number antenna elements.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5A is a table for device utilization for four antennas;

FIG. 5B is a table for device utilization for eight antennas;

FIG. 6A is a table for computation time for four antennas;

FIG. 6B is a table for computation time for eight antennas;

DETAILED DESCRIPTION

Figure 1:
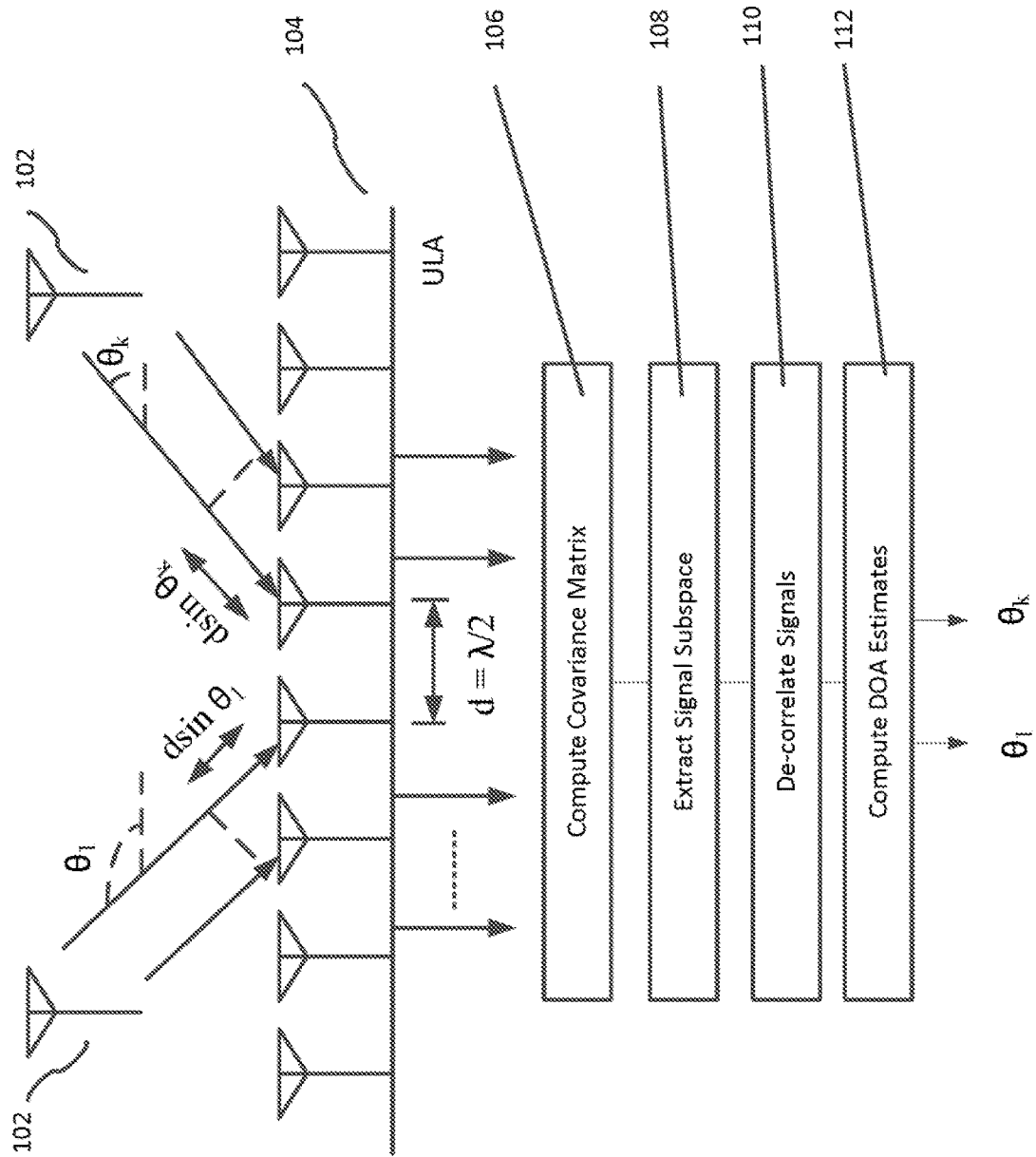
FIG. 1 is a block diagram of direction of arrival estimation employing a ULA.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

To achieve low latency and high throughputs, 5G systems utilize complex antenna systems that must include direction-of-arrival (DoA) estimation capabilities. Communication applications such as channel estimation and beamforming require real-time implementation, and the need for real-time operation is becoming more demanding with multiple-input, multiple-output systems including 5G and 6G communication. In turn, channel estimation and beamforming take into account DoA estimation. Aspects of this disclosure are directed to efficient real-time implementation of DoA estimation algorithms.

The problem of determining the direction of arrival is to find the direction relative to an array of sensors where a sound source is located. In the case of MIMO, direction-of-arrival (DoA) estimation refers to the process of retrieving the direction information of several electromagnetic waves/sources from the outputs of a number of receiving antennas that form a sensor array.

Spatial smoothing is a pre-processing technique and is a prerequisite to be able to perform accurate direction-of-arrival estimation of coherent sources if subspace-based DoA methods are employed. In 5G, a uniform linear array (ULA) of antenna elements may be used. Signals from a number of sources, which are uniformly separated in space by an angle, impinge upon the array. Some sources may be coherent to each other whereas other sources may be uncorrelated.

Several methods for determining DoA have been developed. MUSIC (Multiple Signal Classification) is one such method. MUSIC method assumes that a signal vector, x, consists of complex exponentials, whose frequencies are unknown, in the presence of Gaussian white noise. A crucial assumption is that number of sources, is less than the number of elements in the measurement vector, Given the estimate of, MUSIC estimates the frequency content of the signal or autocorrelation matrix using an eigenspace method. The general idea behind MUSIC method is to use all the eigenvectors that span the noise subspace to improve the performance of the Pisarenko estimator. MUSIC outperforms simple methods such as picking peaks of DFT spectra in the presence of noise, when the number of components is known in advance, because it exploits knowledge of this number to ignore the noise in its final report. However, although the performance advantages of MUSIC are substantial, they are achieved at a cost in computation (searching over parameter space) and storage (of array calibration data).

Estimation of signal parameters via rotational invariant techniques (ESPRIT) is a technique to determine parameters of a mixture of sinusoids in a background noise. This technique is used for angle of arrival estimations. The technique involves computing the eigenvalue decomposition of a covariance matrix of measured data (via algorithms like singular value decomposition).

Techniques such as MUSIC and ESPRIT require eigenvalue decomposition or singular value decomposition of the received data which have high computational cost (on the order of $O(N^3)$). As such, these techniques are unsuitable for real-time hardware implementation due to high processing time and hardware resources required.

SAMV (iterative sparse asymptotic minimum variance) is a parameter free superresolution algorithm for the linear inverse problem in direction-of-arrival (DoA) estimation. It is a powerful tool for the recovery of both the amplitude and frequency characteristics of multiple highly correlated sources in challenging environments (e.g., limited number of snapshots and low signal-to-noise ratio).

Direction of Arrival estimation techniques involve matrix calculations that can substantially increase, in particular as the number of antennas increase. For example, some existing methods of DoA estimation apply forward/backward averaging (FBA) to a covariance matrix that is determined during the spatial smoothing pre-processing. Here, the forward covariance matrix is obtained from equation $$\hat{R} = \frac{1}{L}\sum_{k=1}^{L} X(k)X(k)^H$$

and the backward covariance matrix is $$JR*J$$

where J represents the exchange matrix, i.e., 1's on the antidiagonal and 0's elsewhere and the superscript * stands for the complex conjugate.

The main shortcoming of applying FBA to the covariance matrix is that it increases the computational complexity significantly when the number of antennas increases, especially in the case of multiple-input and multiple-output (MIMO) systems. Another shortcoming is that since the covariance matrix also includes noise along with the signal spaces, applying FBA adversely affects the performance.

Coherent signals occur as an RF signal traverses in multipath environments. Coherence is a statistical relation between two signals. Improvement to DOA estimation of coherent signals has been an important research area in dealing with coherent signals problem in multipath environments. Accurate DoA estimation of coherent sources requires that the spatial smoothing operation de-correlate the data signals and restore the rank of the covariance matrix since the correlated signals make the covariance matrix rank deficient and singular. This operation is a computationally complex task in the DoA estimation algorithm.

In particular, preprocessing may be used for DoA estimation of coherent sources since the covariance matrix becomes singular and rank deficient and it is not possible to estimate the source DoA accurately. Certain methods can be used at the preprocessing stage to improve the rank, but their performance and computational complexity can be great. These preprocessing techniques while being indispensable impose an additional burden on computational cost as well as resource requirements, especially for real-time hardware realizations of DoA estimation algorithms.

Thus, instead of applying spatial smoothing operation to the covariance matrix, the disclosed method applies a spatial smoothing operation to the signal subspace matrix. The computational complexity is reduced due to the fact that the size of the covariance matrix is M×M whereas the size of the signal subspace matrix is M×K, where M is the number of antenna elements or sensors and K is the number of sources and usually M>>K. In addition, the disclosed method does not require either the computationally complex Eigen value decomposition (EVD) or the singular value decomposition (SVD) operations at all in the extraction of the signal and noise subspaces.

A disclosed hardware implementation of the DoA estimation algorithm which applies spatial smoothing technique (of forward-backward averaging (FBA)) to the signal subspace matrix instead of the covariance matrix results in a very efficient implementation which takes only 3 clock cycles to perform the FBA operation while consuming very few resources of, for example, a FPGA. The FBA operation is implemented with fewer addition operations with the proposed method requiring 2M addition operations, whereas the existing methods that apply FBA to the covariance matrix require $M^2$ operations.

FIG. 1 is a block diagram of direction of arrival estimation employing a uniform linear array (ULA). The system shown in FIG. 1 has K narrowband RF source signals 102 in the far-field region of the ULA, which consists of M omni-directional antennas 104. The distance between adjacent antennas is d=λ/2, where λ is the wavelength of the incident signals. The antenna array 104 is shown arranged along the x-axis as M antenna elements. The azimuth angle $\theta_k$ of the $k^{th}$ source is for the K narrowband sources impinging on the antenna array 104. The azimuth angle $\theta_k$ for each $k^{th}$ source may be different angles.

The observed data $X_m$ from the antenna elements of the ULA at any time instant (t) is:

$$x_m(t) = \sum_{i=1}^{K} s_i(t)e^{-j\left(\frac{2\pi}{\lambda}\right)dm\sin(\theta_i)} + n_m(t) \quad (1)$$

where $s_i(t)$ is the i-th incident source signal, λ is the wavelength, (d=λ/2) the spacing distance of ULA, and $n_m(t)$ is the noise at the m-th element.

The received data can be expressed in matrix form as:

$$X(t)=A(\theta)S(t)+N(t) \quad (2)$$

where A(θ) is the (M×K) array response matrix given as:

$$A(\theta)=[a(\theta_1)a(\theta_2)\ldots a(\theta_k)] \quad (3)$$

where $a(\theta_i)$ for I=1, 2, . . . , K is the corresponding array response vector.

$$a(\theta_k)=[1 \ldots u_K^M]^T, \text{ where } u_k=\exp(-j2\pi d \sin(\theta_k)/\lambda) \quad (4)$$

where S(t) is the vector of the received signals $S(t)=[s_1(t) \; s_2(t) \ldots s_K(t)]^T$, and $N(t)=[n_1(t) \ldots n_M(t)]$, where N(t) is the (M×1) additive white Gaussian noise (AWGN) vector.

The disclosed algorithm for computing the DoA may include six steps:

Step 1: Compute Covariance Matrix (106)

The N snapshots of the signal data received from the antenna array of the ULA are received and used to compute the covariance matrix $R_x$ according to:

$$R_x = \frac{1}{N}\sum_{t=1}^{N} x_i(t)x_i(t)^H \qquad (5)$$

where $x_i(t)$ is the column vector from the $i^{th}$ antenna element and $(\ )^H$ is the conjugate transpose operation.

Step 2: Extract Signal Space (108)

Using QR Decomposition:

The covariance matrix $R_x$ computed in Step 1 is factorized using QR decomposition to extract the signal space. Matrix decomposition using QR factorization applied on $R_x$ can be expressed as:

$$QR(R_x) = QR = [Q_s\ Q_n]\begin{bmatrix} R_s \\ \vdots \\ 0 \end{bmatrix} \qquad (6)$$

where $Q_s$ is the (M×K) signal space matrix and $Q_n$ is the (M×(K−M)) noise space matrix, R is the (K×M) upper triangular signal space matrix, and O is the lower triangular matrix that has all entities as zeros.

For further processing, the signal space data is contained in either $Q_s$ or $R_s$. To estimate DOAs of K sources, only the first K columns of $Q_s$ or $R_s^T$ need to be extracted. For example, in the case of K=2, $Q_s$ is given by:

$$Q_s(1:M,\ 1:2) = \begin{bmatrix} q_{11} & 0 \\ \vdots & \vdots \\ q_{M1} & q_{M2} \end{bmatrix} \qquad (7)$$

Using Cholesky Decomposition:

In case of Cholesky factorization, matrix Rx is decomposed as:

$$R_x = LL^H \qquad (8)$$

where L is a unique lower triangulation matrix with positive diagonal entries.

For two sources, only the first two columns of L need to be extracted to compute the DOA estimates. The submatrix LS of size M×2 is obtained as:

$$L_s(1:M,\ 1:2) = \begin{bmatrix} l_{11} & 0 \\ \vdots & \vdots \\ l_{M1} & l_{M2} \end{bmatrix} \qquad (9)$$

$L_S$ may also be referred to as $Q_s$. The signal space data matrix QS(1:M, 1:K) is used to estimate the DoAs of a pair of coherent sources ($s_1$ and $s_2 = as_1$), where (0<a≤1). When a=1, the two sources are fully coherent.

Step 3: De-Correlate Signals Using Forward/Backward Averaging

In this step, the signal space is de-correlated by applying the forward/backward averaging method to the signal space data matrix in (7) for QR decomposition or in (9) for Cholesky decomposition.

$$Q_{fb} = (0.5)[Q_s(1:M,1:K) + J_M(Q_s(1:M,1:K))^* J_K] \qquad (10)$$

where $J_M$ is (M×M) and $J_K$ is (K×K) matrices with ones in the off diagonal elements and zeros in the rest of the elements; $(\ )^*$ is the complex conjugate operation. The dimension of $Q_{fb}$ is directly related to the number of sources K.

The proposed method is unlike the existing forward/backward averaging. It provides much lower computational complexity and processing time since it applies on the signal space with dimension (M×K) whereas the existing schemes are applied on the covariance matrix of dimension (M×M). This will reduce the computational complexity and processing time since the number of antennas, M, is much higher than the number of sources, K.

For further processing, $Q_{fb}$ data matrix is partitioned into two sub-matrices as:

$$Q_{fb1} = Q_{fb}(1:M-1,1:2)$$

$$Q_{fb2} = Q_{fb}(2:M,1:2) \qquad (11)$$

Step 4: Compute Direction Matrix Using Least Squares (LS) Solution

Since range of range $\{Q_{fb1}\}$ = range $\{A\}$, there must exist a unique matrix T, such that $$Q_{fb} = \begin{bmatrix} Q_{fb1} \\ Q_{fb2} \end{bmatrix} = \begin{bmatrix} A_1(\theta)T \\ A_1(\theta)\Phi(\theta)T \end{bmatrix} \qquad (12)$$

where $A_1(\theta) = [a_1(\theta_1)\ a_1(\theta_2)]$ is the (M×2) is the array response matrix, and $\Phi(\theta)$ is a (2×2) diagonal matrix containing information about the DOAs of incident sources.

$$\Phi(\theta) = \text{diag}\left[e^{\frac{j2\pi d\cos(\theta_1)}{\lambda}} \cdots e^{\frac{j2\pi d\cos(\theta_2)}{\lambda}}\right] \qquad (13)$$

since $Q_{fb1}$ and $Q_{fb2}$ span the same signal space. This leads to both spaces being related by a nonsingular transform $\Psi$ as follows:

$$Q_{fb2} = Q_{fb1}\Psi \qquad (14)$$

Equation (14) can be expressed as:

$$\Psi = T^{-1}\Phi(\theta)T \qquad (15)$$

The least square solution of (14) can be found as:

$$\Psi = [Q_{fb1}^H Q_{fb1}]^{-1} Q_{fb1} Q_{fb2} \qquad (16)$$

Step 5: Compute Eigenvalues

The eigenvalues of $\Psi$ in (16) are computed and are then used to estimate the DOAs of incident sources. For a given matrix A, the eigenvalues can be calculated as determinant $(A - \lambda I) = 0$.

Step 6: Compute DOA Estimates

In the final step, angle estimates are computed as:

$$\theta_K = \sin^{-1}\left[\frac{\text{angle}(\Psi_K)}{2\pi ci}\right], \text{ where } \Psi_K \text{ is the } k^{th} \text{ eigenvalue.} \qquad (17)$$

The disclosed invention has much lower computational complexity and can estimate both non-coherent and coherent sources. Comparison of the proposed method with existing methods in terms of complex-valued multiplication and addition operations is presented in Table 1. This comparison is based on the forward/backward averaging (FBA) method being applied to the signal space in the proposed method while it is applied to the covariance matrix in the existing methods. N is the number of antenna elements; N, the number of snapshots; and K is the number of signal sources. The expressions for multiplication and addition operations for the disclosed method are based on (10) while those for the existing methods are based on (18).

$$\hat{R}=[(0.5)(R_x(M,M)+J_M(Rx(M,M))^*J_M], \quad (18)$$

where all matrices are of size M×N.

TABLE 1

FBA COMPLEXITY COMPARISON

| | Multiplications | Additions |
| --- | --- | --- |
| Disclosed Method | $M^2K + MK^2$ | $(M-1)MK$ |
| Existing Methods | $2M^3$ | $M^2(2M-1)$ |

Figure 2:
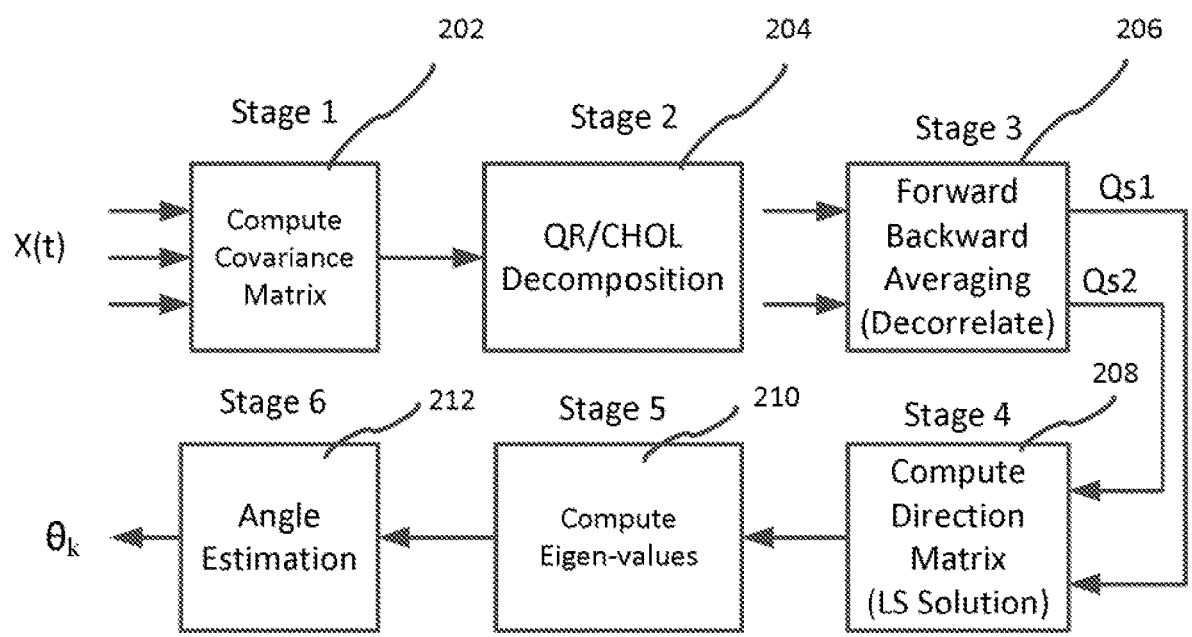
FIG. 2 is a system architecture for field programmable gate array hardware implementation.

The hardware architecture for the implementation of the proposed method for DOA estimation of coherent sources is shown in one aspect as FIG. 2. The implementation follows a 6-stage pipelined architecture for high throughput. These six stages correspond to the six steps of the disclosed algorithm, in FIG. 1. The six stages are connected with one another to form a pipe structure. Instructions enter from one end and are overlapped during execution. In particular, the fetch, decode and execute phase of an instruction cycle are overlapped.

In an embodiment, the pipeline is divided into segments, where each segment includes an input register followed by a combinational circuit. The register holds data and the combinational circuit performs operations on the stored data. The output of the combinational circuit is applied to the input register of the next segment. The pipeline reads an instruction from the memory while previous instructions are being executed in other segments of the pipeline. Thus, multiple instructions are executed simultaneously. In an embodiment, the instruction cycle is divided into segments of equal duration.

In an embodiment, the FPGA contains a pipelined array of programmable logic blocks, and reconfigurable interconnects allowing the blocks to be wired together. The logic blocks are configured to perform complex combinational functions. The first logic block 202 takes the input data X(t) and computes a covariance matrix $R_x$. The second logic block 204 performs QR/CHOL decomposition. The logic block 204 factorizes the covariance matrix $R_x$ using QR decomposition to extract the signal space. The logic block 204 factorizes the covariance matrix $R_x$ using Cholesky decomposition.

The next logic block 206 de-correlates signals using Forward/Backward Averaging.

In this block, the signal space is de-correlated by applying the forward/backward averaging method to the signal space data matrix in (7) for QR decomposition or in (9) for Cholesky decomposition. Further, $Q_{fb}$ data matrix is partitioned into two sub-matrices.

The next logic block 208 computes a direction matrix using Least Squares (LS) Solution φ. Logic block 210 computes Eigen-values of the LS solution φ.

The final logic block 212 computes estimates for the angle $\theta_k$ using the Eigen-values.

Figure 3:
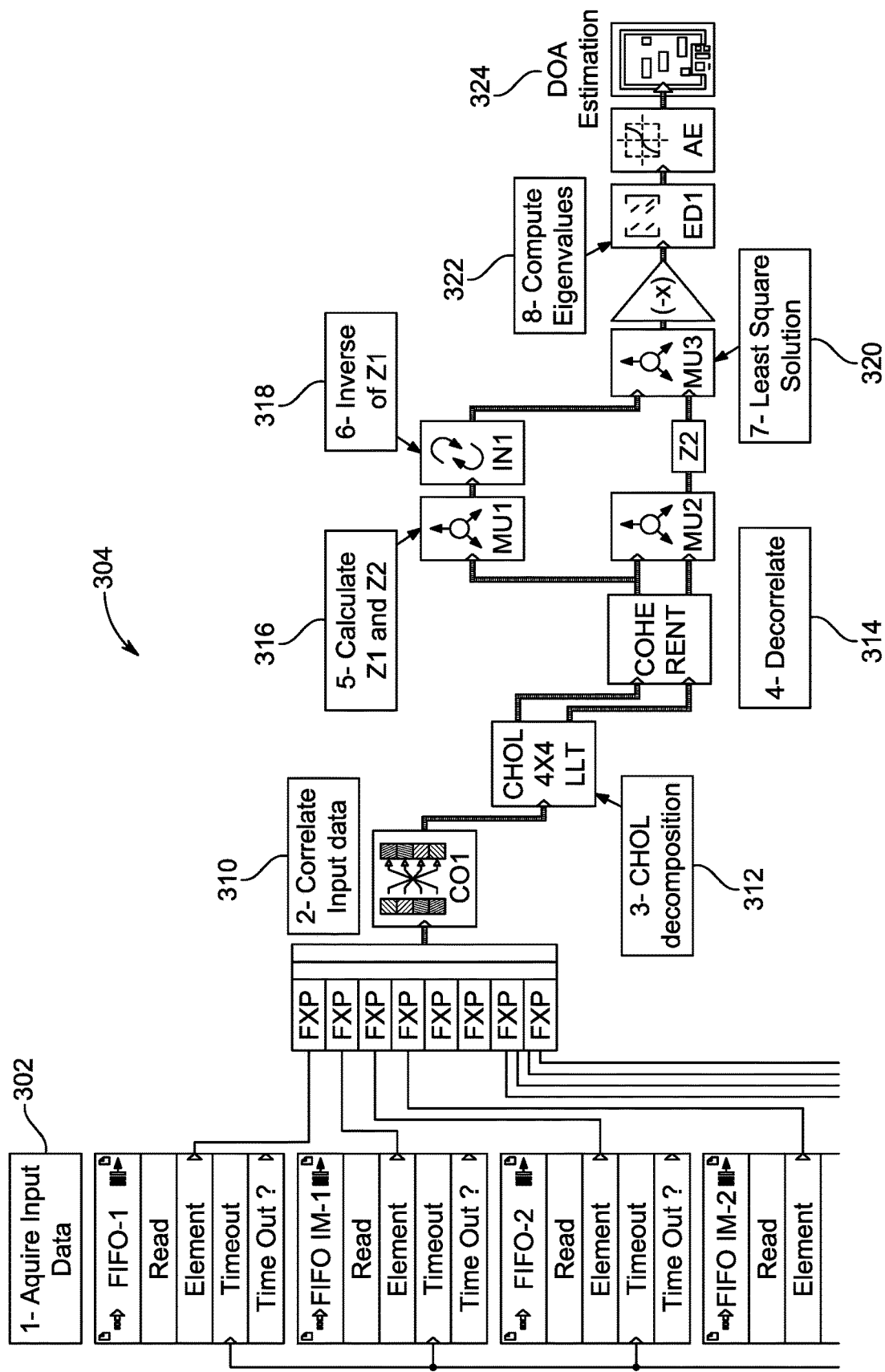
FIG. 3 is a schematic diagram for the pipeline in FIG. 2.

FIG. 3 below shows a part of the LabVIEW FPGA schematic of the pipelined implementation of FIG. 2. In 302, data signal values are retrieved from the FIFO (first-in first-out) queue 302 and fed to the pipeline 304 for pipelined instruction processing.

A design for the FPGA was programmed in LabVIEW. LabVIEW is a graphical programming environment used to develop automated research, validation, and production test systems. The FPGA was programmed using FPGA modules which provide high throughput mathematical operations. Fixed-point data type was selected and data size with a word length of 16 bits and an integer length of 8 bits was used. This ratio of 16/8 data size was selected to optimize resource consumption and computation time.

LabVIEW FPGA schematics (or block diagrams) were created for implementing the DOA estimation algorithm using QR and Cholesky factorization for both a 4-element ULA and an 8-element ULA; and DOA of up to K=2 sources are estimated (note that the maximum number of sources has been kept at K=2 due to FPGA hardware limitations). These schematics files were compiled for FPGA simulation and to generate metrics on FPGA resource consumption and processing speed in order to do a performance evaluation of the DOA estimation algorithms. FPGA codes for coherent sources with FBA operation applied to the covariance matrix to de-correlate the signals have also been compiled for comparison.

In 310, input data is correlated. In 312, decomposition is performed using Cholesky factorization. In 314, signals are de-correlated using Forward/Backward Averaging. In 316, 318 calculations are performed to partition into sub-matricies. In 320, direction matrix is computed using Least Squares (LS) Solution. In 322, eigenvalues of the least square solution are computed. In 324, the direction of arrival is estimated.

Figure 4:
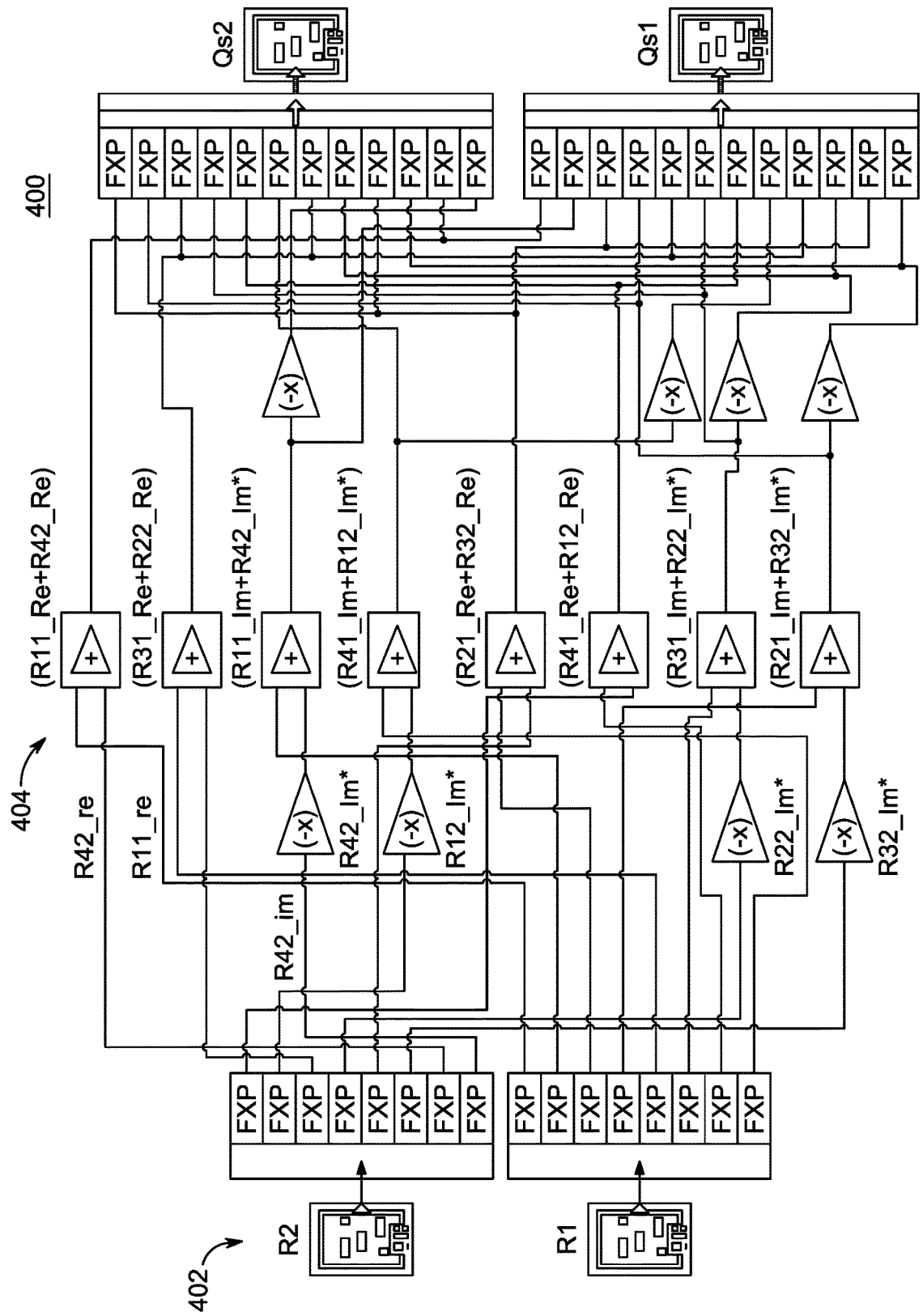
FIG. 4 is a schematic for FBA operation for four antennas.

The difference in the implementation between the non-coherent and coherent cases is that the FBA operation can be implemented with only a few addition operations. FIG. 4 is a LabVIEW schematic for FBA operation in an M=4 case. In the M=4 case, the FBA operation requires only 8 addition operations for the disclosed method. In contrast, twice as many addition operations are required when FBA is applied to the covariance matrix (i.e., instead of the signal space data matrix in the disclosed method). In the case of M=8, the FBA operation requires 16 addition operations for the disclosed method, whereas 64 addition operations are required when FBA is applied to the covariance matrix.

FIG. 5A and FIG. 5B show Table II and Table III, respectively. Table II and Table III show % device utilization results from FPGA compilation reports of the FPGA implementation of the disclosed DOA estimation algorithm for the two cases of M=4 and M=8, respectively. Results are also shown for the non-coherent case and for the coherent case with FBA applied to the covariance matrix, for comparison. It is to be noted here that for M=8 the resource utilization data for QR was not available because LabVIEW FPGA schematics for QR-decomposition based DOA estimation could not be compiled on the Virtex-5 FPGA because the design would not fit on the FPGA.

It can be seen in the Tables II and III that % resource utilization for Cholesky decomposition based DOA estimation algorithms is the lowest (for M=4 case). As expected, the % device utilization for the coherent case is higher compared with the non-coherent case due to the FBA step required for spatial smoothing, for both M=4 and M=8 cases. Furthermore, the % device utilization for the proposed method is lower than that for existing methods where FBA is applied to the covariance matrix.

FIGS. 6A and 6B show Table IV and Table V, respectively. Table IV and Table V show the computation times (in μs) for the execution of the pipeline of FIG. 2 for the case M=4 and M=8, respectively. The computation time is calculated as:

Computation time=(Total no. of clock cycles)*(1/ $f$max)

The number of clock cycles for each stage of the pipeline was calculated based on the longest path in the FPGA design for the disclosed algorithm as well as QR. The tables show the total number of clock cycles consumed by the DOA estimation algorithm during runtime execution on the FPGA, and the maximum computation speed (fmax) in MHz. The fmax was obtained from the successful FPGA compilation report with respect to the onboard base clock of 40 MHz. Due to a failure in compiling the FPGA schematics for QR, the maximum computation speed (fmax) was not available.

It can be observed in the tables IV, V that it takes only 3 clock cycles more for the coherent case compared with the non-coherent case. This is due to the fact that the FBA operation is implemented in parallel and can be computed in only 3 clock cycles for both existing methods and proposed method.

The Tables IV, V clearly show that computation times for Cholesky decomposition based DOA estimation algorithms are the lowest (for M=4 case). For coherent sources, the computation time for the disclosed method is slightly better than that for the existing methods.

Figure 7:
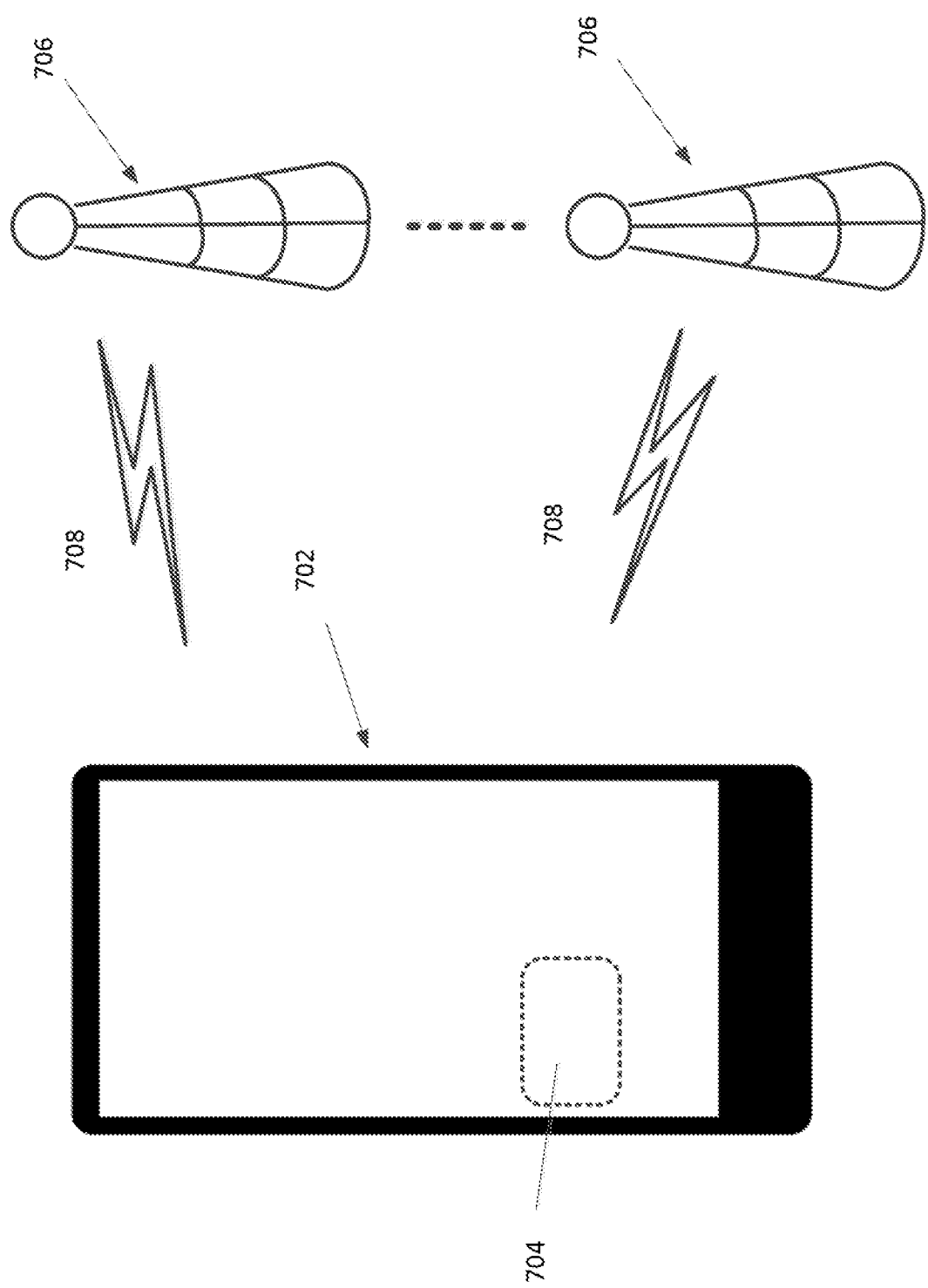
FIG. 7 is a system diagram for a communications device.

FIG. 7 is a system diagram for a communications device. In an embodiment, the FPGA 704 for DoA estimation is part of a communications device 702, in a 5G or 6G cellular communication system. The cellular communication system may include cell towers 706 that communicate with the communications device 702 via multiple RF signals 708. The cell towers 706 may be arranged for optimal coverage of a communications area.

In an embodiment, the DoA estimation FPGA is part of circuitry for channel estimation and/or beamforming in order to achieve real-time implementation. Furthermore, the DoA estimation FPGA is part of circuitry for multiple-input, multiple-output systems that require real time implementation.

Figure 8:
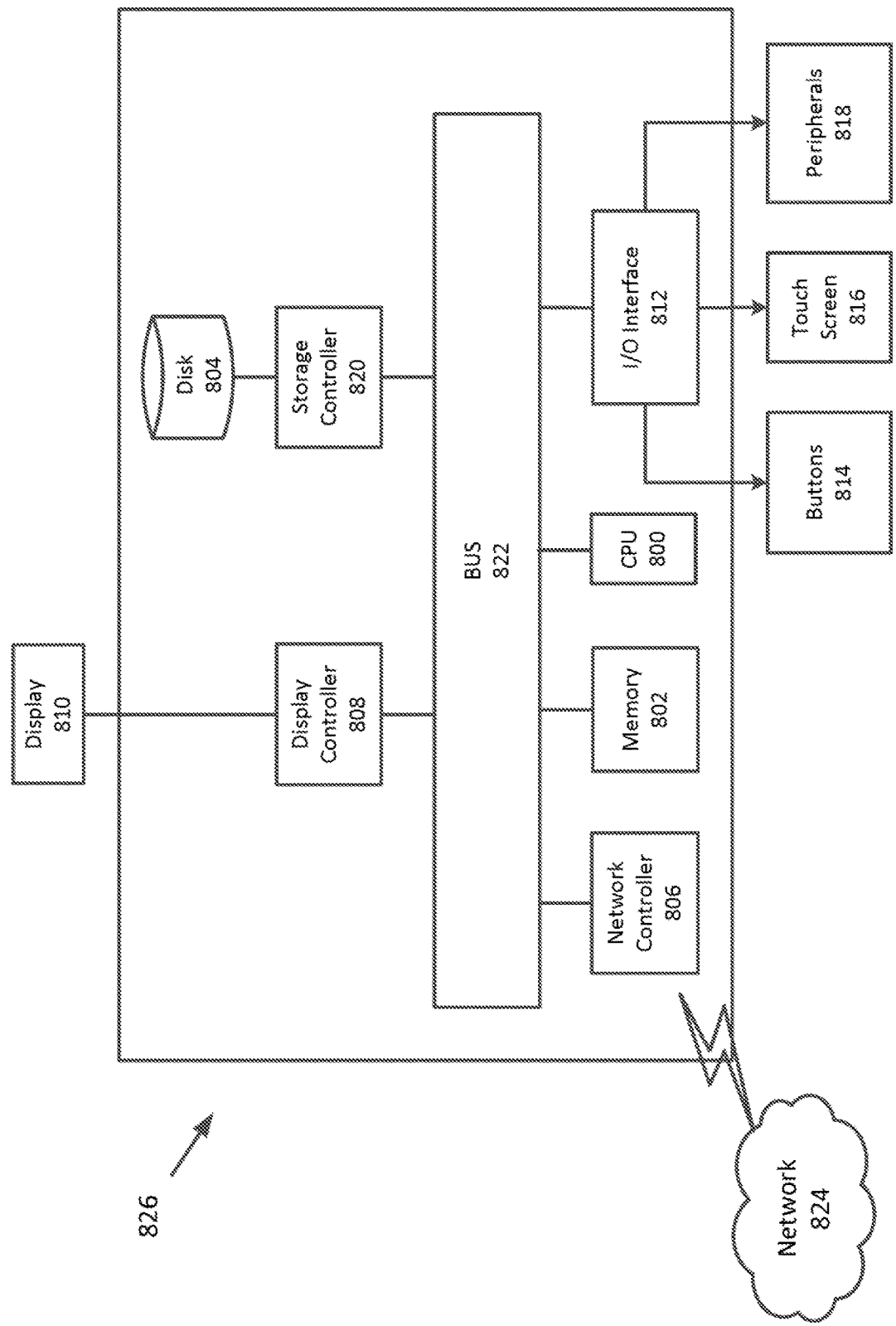
FIG. 8 is a block diagram of a general purpose computer.

FIG. 8 is a block diagram of a general purpose computer.

In one implementation, the functions and processes for developing a FPGA, such as the LabVIEW package, may be implemented by a computer 826. Next, a hardware description of the computer 826 according to exemplary embodiments is described with reference to FIG. 8. In FIG. 8, the computer 826 includes a CPU 800 which performs the processes for circuit design. The process data and instructions may be stored in memory 802. These processes and instructions may also be stored on a storage medium disk 804 such as a hard drive (HDD) or portable storage medium or may be stored remotely. Further, the storage is not limited by the form of the computer-readable media on which the instructions of the circuit design process are stored. For example, the instructions may be stored on CDs, DVDs, in FLASH memory, RAM, ROM, PROM, EPROM, EEPROM, hard disk or any other information processing device with which the computer 826 communicates, such as a server or computer.

Further, a circuit design program may be provided as a utility application, background daemon, or component of an operating system, or combination thereof, executing in conjunction with CPU 800 and an operating system such as Microsoft® Windows®, UNIX®, Oracle® Solaris, LINUX®, Apple macOS® and other systems known to those skilled in the art.

In order to achieve the computer 826, the hardware elements may be realized by various circuitry elements, known to those skilled in the art. For example, CPU 800 may be a Xenon® or Core® processor from Intel Corporation of America or an Opteron® processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processor cores cooperatively working in parallel to perform the instructions of the inventive processes described above.

The computer 826 in FIG. 8 also includes a network controller 806, such as an Intel Ethernet PRO network interface card from Intel Corporation of America, for interfacing with network 824. As can be appreciated, the network 824 can be a public network, such as the Internet, or a private network such as LAN or WAN network, or any combination thereof and can also include PSTN or ISDN sub-networks. The network 824 can also be wired, such as an Ethernet network, or can be wireless such as a cellular network including EDGE, 3G, 4G, 5G wireless cellular systems. The wireless network can also be WiFi®, Bluetooth®, or any other wireless form of communication that is known.

The computer 826 further includes a display controller 808, such as a NVIDIA® GeForce® GTX or Quadro® graphics adaptor from NVIDIA Corporation of America for interfacing with display 810, such as a Hewlett Packard® HPL2445w LCD monitor. A general purpose I/O interface 812 interfaces with a keyboard and/or mouse 814 as well as an optional touch screen panel 816 on or separate from display 810. General purpose I/O interface also connects to a variety of peripherals 818 including printers and scanners, such as an OfficeJet® or DeskJet® from Hewlett Packard®.

The general purpose storage controller 820 connects the storage medium disk 804 with communication bus 822, which may be an ISA, EISA, VESA, PCI, or similar, for interconnecting all of the components of the computer 826. A description of the general features and functionality of the display 810, keyboard and/or mouse 814, as well as the display controller 808, storage controller 820, network controller 806, and general purpose I/O interface 812 is omitted herein for brevity as these features are known.

Numerous modifications and variations of the present invention are possible in light of the above teachings. It is therefore to be understood that within the scope of the appended claims, the invention may be practiced otherwise than as specifically described herein.

The invention claimed is:

1. A communications system, comprising:
   a plurality of radio frequency (RF) signal generators;
   a uniform linear array of M antennas;
   a communications device having circuitry including a field programmable gate array (FPGA) having pipelined stages in which execution of overlapping instructions estimate a direction of arrival of the RF signals from the RF signal generators,
   wherein a preprocessing stage of the FPGA includes at least one configurable logic block configured to apply forward/backward averaging spatial smoothing to a signal space matrix extracted from a covariance matrix in the preprocessing stage; and
   the FPGA further includes at least one configurable logic block, connected to the preprocessing stage, configured to compute the direction of arrival angle for the RF signals using a least squares method.

2. The communications system of claim 1, wherein the FPGA further includes at least one configurable logic block configured to factorize the covariance matrix using a QR decomposition process to extract the signal space matrix.

3. The communications system of claim 1, wherein the FPGA further includes at least one configurable logic block configured to factorize the covariance matrix using a Cholesky decomposition process to extract the signal space matrix.

4. The communications system of claim 2, wherein the signal space is de-correlated by applying forward backward averaging to the signal space matrix extracted using the QR decomposition.

5. The communications system of claim 3, wherein the signal space is de-correlated by applying forward backward averaging to the signal space matrix extracted using the Cholesky decomposition.

6. The communications system of claim 1, wherein the M antennas are omni-directional antennas.

7. The communications system of claim 1, wherein the FPGA includes six stages, a first stage to compute a covariance matrix, a second stage to extract signal space from the covariance matrix, a third stage to de-correlate signals by applying the forward/backward averaging method to the extracted signal space to obtain a forward backward (fb) matrix, a fourth stage to compute a direction matrix from the fb matrix, a fifth stage to compute eigenvalues, and a sixth stage to compute a direction of arrival angle using the eigenvalues.

8. The communications system of claim 1, wherein the uniform linear array of M antennas includes cell phone towers.

9. The communications system of claim 1, wherein the antennas in the uniform linear array of M antennas are omnidirectional.

10. The communications system of claim 1, wherein the RF signals are in the K narrow band.

* * * * *